(12) United States Patent
Wisniewski et al.

(10) Patent No.: US 12,485,270 B2
(45) Date of Patent: Dec. 2, 2025

(54) FLUID PUMP

(71) Applicant: Berlin Heart GmbH, Berlin (DE)

(72) Inventors: Adrian Wisniewski, Berlin (DE); Jörg Müller, Berlin (DE); Bodo Schmidt, Teltow (DE)

(73) Assignee: Berlin Heart GmbH, Berlin (DE)

( * ) Notice: Subject to any disclaimer, the term of this patent is extended or adjusted under 35 U.S.C. 154(b) by 558 days.

(21) Appl. No.: 17/420,362

(22) PCT Filed: Jan. 20, 2020

(86) PCT No.: PCT/EP2020/051253
§ 371 (c)(1),
(2) Date: Jul. 1, 2021

(87) PCT Pub. No.: WO2020/152086
PCT Pub. Date: Jul. 30, 2020

(65) Prior Publication Data
US 2022/0088370 A1 Mar. 24, 2022

(30) Foreign Application Priority Data
Jan. 21, 2019 (EP) ..................... 19152910

(51) Int. Cl.
*A61M 60/422* (2021.01)
*A61M 60/122* (2021.01)
(Continued)

(52) U.S. Cl.
CPC ........ *A61M 60/422* (2021.01); *A61M 60/148* (2021.01); *A61M 60/178* (2021.01);
(Continued)

(58) Field of Classification Search
CPC ............. F16C 2316/18; A61M 60/422; A61M 60/148; A61M 60/178; A61M 60/237;
(Continued)

(56) References Cited

U.S. PATENT DOCUMENTS 5,360,317 A * 11/1994 Clausen .............. F04D 29/0413
415/206
5,957,672 A 9/1999 Aber
(Continued)

FOREIGN PATENT DOCUMENTS

| WO | WO 9618358 A1 | 6/1996 |
| WO | WO 03075981 A1 | 9/2003 |
| WO | WO 2016086137 A1 | 6/2016 |

OTHER PUBLICATIONS

International Search Report, issued in International Patent Application No. PCT/EP2020/051253, dated Mar. 27, 2020, pp. 1-36, European Patent Office, Rijswijk, Netherlands.

*Primary Examiner* — Peter J Bertheaud
(74) *Attorney, Agent, or Firm* — Crowell & Moring LLP

(57) ABSTRACT

A fluid pump is provided for delivering a fluid, particularly blood, comprising: a housing with a fluid inlet and a fluid outlet and a rotor, which is mounted in the housing such that it can rotate about an axis of rotation in order to deliver the fluid from the fluid inlet to the fluid outlet, the rotor being mounted in the housing by means of a mechanical bearing. A flow cross-section between the rotor and the housing has a local or partial flow cross-section minimum in the direction of the axis of rotation in the region of the mechanical bearing.

18 Claims, 7 Drawing Sheets

(51) Int. Cl.
- A61M 60/148 (2021.01)
- A61M 60/178 (2021.01)
- A61M 60/216 (2021.01)
- A61M 60/221 (2021.01)
- A61M 60/232 (2021.01)
- A61M 60/237 (2021.01)
- A61M 60/419 (2021.01)
- A61M 60/81 (2021.01)
- A61M 60/818 (2021.01)
- A61M 60/82 (2021.01)
- A61M 60/824 (2021.01)
- A61M 60/825 (2021.01)
- F04D 3/00 (2006.01)
- F04D 13/06 (2006.01)
- F04D 29/041 (2006.01)
- F04D 29/046 (2006.01)
- F04D 29/048 (2006.01)

(52) U.S. Cl.
CPC ........ *A61M 60/216* (2021.01); *A61M 60/221* (2021.01); *A61M 60/232* (2021.01); *A61M 60/237* (2021.01); *A61M 60/419* (2021.01); *A61M 60/81* (2021.01); *A61M 60/818* (2021.01); *A61M 60/82* (2021.01); *A61M 60/824* (2021.01); *A61M 60/825* (2021.01); *F04D 3/00* (2013.01); *F04D 13/0633* (2013.01); *F04D 29/0413* (2013.01); *F04D 29/0467* (2013.01); *F04D 29/048* (2013.01); *A61M 60/122* (2021.01); *F16C 2316/18* (2013.01)

(58) Field of Classification Search
CPC .. A61M 60/825; A61M 60/824; A61M 60/82; A61M 60/232; A61M 60/419; A61M 60/221; A61M 60/818; A61M 60/81; A61M 60/216; A61M 60/122; F04D 29/048; F04D 29/0467; F04D 13/0633; F04D 29/0413; F04D 3/00
See application file for complete search history.

(56) References Cited

U.S. PATENT DOCUMENTS

| | | | |
|---|---|---|---|
| 9,616,157 B2* | 4/2017 | Akdis | F04D 29/0473 |
| 2018/0050139 A1* | 2/2018 | Siess | A61M 60/13 |

* cited by examiner

FLUID PUMP

CROSS-REFERENCE TO RELATED APPLICATIONS

This application is a 371 nationalization of international patent application PCT/EP2020/051253 filed Jan. 20, 2020, which claims priority under 35 USC § 119 to European patent application EP 19 152 910.6 filed Jan. 21, 2019. The entire contents of each of the above-identified applications are hereby incorporated by reference.

TECHNICAL FIELD

The present invention relates to a fluid pump for conveying a fluid, in particular for conveying blood.

DETAILED DESCRIPTION

Figure 1:
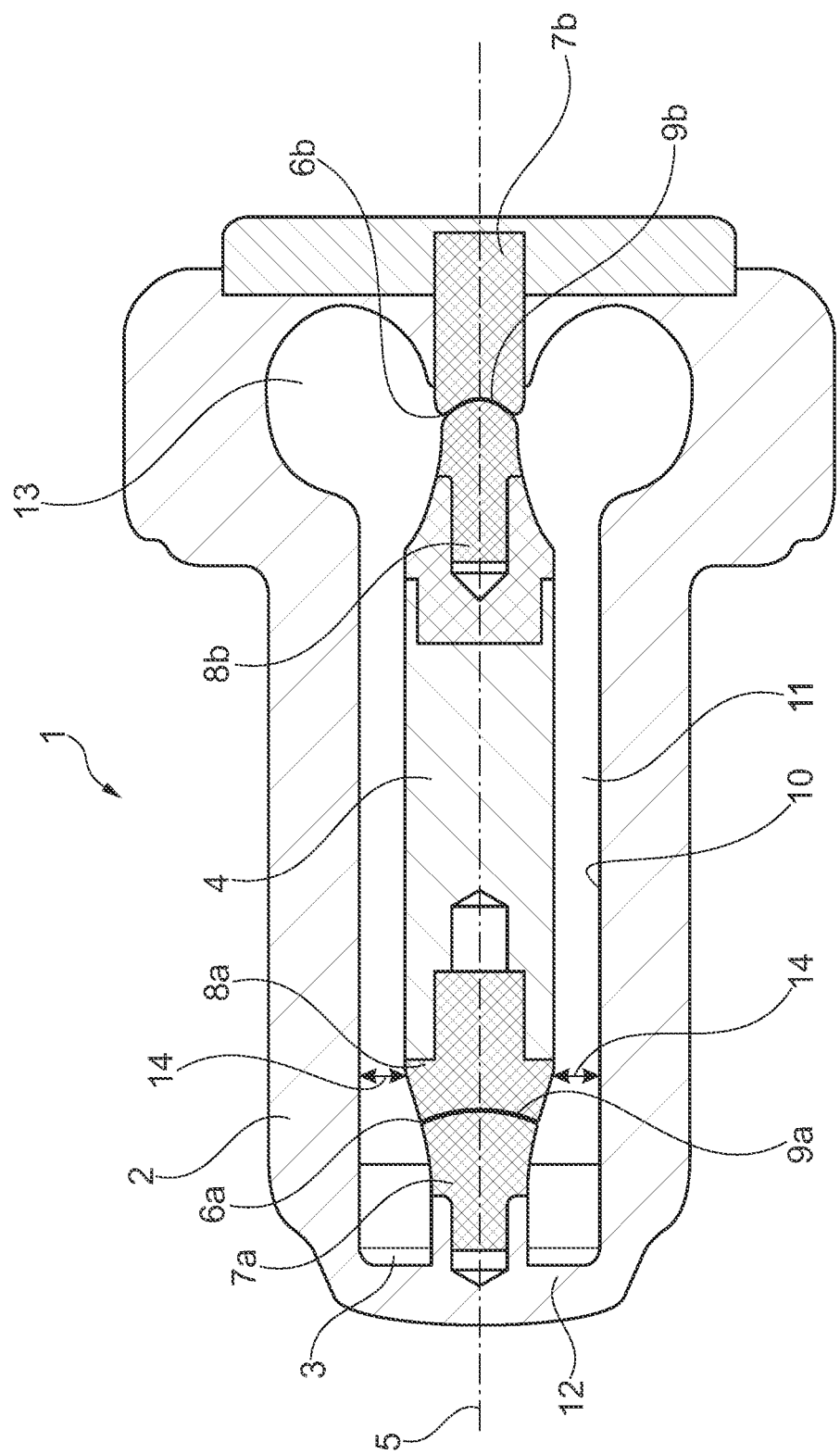
FIG. 1 shows a schematic longitudinal sectional view of a fluid pump according to the invention in accordance with a first exemplary embodiment.

A known problem of intracorporeal blood pumps comprising mechanical bearings is insufficient bearing washout and insufficient removal of heat developing in the bearing, which develops due to friction of the bearing elements, for example. Insufficient bearing washout and insufficient heat removal in the blood pump can increase the risk of thrombus formation and coagulation within the blood pump, and thus represent a life-threatening hazard for the patient.

It is thus an object of the present invention to provide a fluid pump that enables enhanced bearing washout and greater heat removal in the region of the bearing.

The fluid pump according to the invention for conveying fluid, in particular blood, comprises a housing including a fluid inlet and a fluid outlet and a rotor, which is arranged rotatably about an axis of rotation within the housing for conveying the fluid from the fluid inlet to the fluid outlet. The rotor is mounted in the housing by way of a mechanical bearing. The fluid pump according to the invention is characterized in that a profile of a flow cross-section between the rotor and the housing, in the direction of the axis of rotation, has a local or regional flow cross-section minimum in the region of the mechanical bearing.

The flow cross-section here shall be understood to mean an effective flow cross-section surface area within the blood pump, radial to the axis of rotation, through which the conveyed fluid flows between the bearing or the rotor and the housing.

Furthermore, a local flow cross-section minimum of the profile of the flow cross-section in the direction of the axis of rotation in the region of the mechanical bearing shall be understood to mean a local reduction in the flow cross-section or the flow cross-section surface area at the same axial height as the mechanical bearing, based on the axis of rotation.

Furthermore, a regional flow cross-section minimum of the profile of the flow cross-section in the direction of the axis of rotation in the region of the mechanical bearing shall be understood to mean a reduction in the flow cross-section surface area which reaches a minimum value at the same axial height as the mechanical bearing, based on the axis of rotation, and remains at this minimum value over a certain region of the profile thereof in the direction of the axis of rotation.

The local or regional flow cross-section minimum can be formed by a reduction and/or an increase in the flow cross-section in a downstream direction (that is, in a direction extending from the fluid inlet to the fluid outlet and parallel to the axis of rotation) and/or in an upstream direction (that is, in a direction extending from the fluid outlet to the fluid inlet and parallel to the axis of rotation).

The flow cross-section at the local or regional flow cross-section minimum can be reduced compared to a region abutting, upstream (that is, in the upstream direction) and/or a downstream (that is, in the downstream direction), the region of the mechanical bearing and/or of the first bearing component and/or of the second bearing component and/or of the contact region.

The region of the mechanical bearing or the bearing region shall essentially be understood to mean a flow region of the fluid that extends radially to and along the first and second bearing elements, that is, radially to and along the entire mechanical bearing.

The wording "axial height" hereafter always relates to the axis of rotation. At "the same axial height" also means "radially to."

By forming a flow cross-section minimum in the region of the mechanical bearing, the conveyed fluid flow can be accelerated in the region of the mechanical bearing. As a result of the acceleration of the fluid flow, the mechanical bearing is washed out better, and heat developing in the bearing, for example due to friction of the bearing elements, can be eliminated more quickly. In this way, the risk of thrombus formation and coagulation, and thus a hazard for the patient, is reduced in a blood pump.

In addition, greater heat removal can be achieved through an increase in the wall shear stress, and thus in the heat transfer, through improved mixing of the fluid in the region of the bearing, or through improved conduction of the heat in the solid bodies present in the fluid pump as a result of a selection of corresponding materials.

The mechanical bearing can in particular comprise a first bearing component, connected to the housing, and a second bearing component, connected to the rotor. The first and second bearing components can rest against one another in the direction of the axis of rotation in a contact region, except for a bearing gap. The local or regional flow cross-section minimum can be located in the region of the first bearing component, in particular at the same axial height as the first bearing component, in the region of the second bearing component, in particular at the same axial height as the second bearing component, and/or in the region of the contact region, in particular at the same axial height as the contact region.

An increase in the flow cross-section can adjoin the local or regional flow cross-section minimum in the upstream and/or downstream direction. The increase in the flow cross-section, which adjoins the flow cross-section minimum in the upstream and/or downstream direction, can be arranged in the region of the mechanical bearing and/or of the first bearing component and/or of the second bearing component and/or of the contact region.

Moreover, the housing can comprise an inner wall that delimits a fluid region and is closed in a circumferential direction around the axis of rotation. The local or regional flow cross-section minimum can result from a profile of a wall diameter of the inner wall, in the direction of the axis of rotation, having a local or regional minimum in the region of the mechanical bearing. Enhanced flushing of the mechanical bearing can thus be achieved by a design adaptation of an element that is not directly connected to the mechanical bearing, namely at the wall, whereby, for example, a particularly simple and/or robust design of the fluid pump can be made possible.

In particular, the profile of the wall diameter can have a local or regional minimum in the region of the first bearing component, in the region of the second bearing component and/or in the region of the contact region.

The inner wall can have a radial constriction. The radial constriction can be located completely or partially in the region of the first bearing component and/or in the region of the second bearing component and/or in the region of the contact region. The local or regional flow cross-section minimum can result from the location of the radial constriction. The radial constriction can be arranged at the inner wall so as to extend completely around a circumference of the inner wall. The radial constriction can be arranged at the inner wall so as to extend substantially around a circumference of the inner wall, for example so as to extend around more than 90%, more than 80%, more than 70%, more than 60%, or more than 50% of the circumference of the inner wall. The radial constriction can be designed to be radially symmetrical or not radially symmetrical. The radial constriction can be arranged at a portion of a circumference of the inner wall, for example so as to extend around less than 50%, less than 40%, less than 30%, less than 20%, or less than 10% of the circumference of the inner wall. The inner wall can comprise multiple radial constrictions at the same axial height and/or at different axial heights.

Furthermore, the local flow cross-section minimum can result from a profile of a bearing diameter of the mechanical bearing having a local or regional maximum in the direction of the axis of rotation. In particular, the profile of the bearing diameter can have a local or regional maximum in the region of the first bearing component, in the region of the second bearing component and/or in the region of the contact region. It is particularly advantageous when the second bearing component has a larger diameter than the first bearing component, that is, the second bearing component is widened in relation to the first bearing component.

The local flow cross-section minimum can result from a combination of a profile of the wall diameter (as described above) and a profile of the bearing diameter (as described above).

The flow cross-section can be reduced in the local or regional flow cross-section minimum by ≥10% and/or ≤50%, in particular ≥20% and/or ≤40%, preferably 30%, compared to a flow cross-section in a region adjoining the bearing region upstream and/or downstream.

Furthermore, the fluid pump can be designed in such a way that the flow cross-section, in the direction of the axis of rotation, increases by ≥2% of the flow cross-section minimum per mm and/or ≤30% of the flow cross-section minimum per mm upstream of the flow cross-section minimum, and increases by ≥0% of the flow cross-section minimum per mm and/or ≤20% of the flow cross-section minimum per mm, in particular ≤10% of the flow cross-section minimum per mm, downstream of the flow cross-section minimum. An increase in the flow cross-section upstream of the flow cross-section minimum shall be understood to mean a decrease in the flow cross-section in the flow direction of the fluid in front of and up to the flow cross-section minimum. A slow or only minor increase in the flow cross-section downstream, that is, in the flow direction of the fluid, has a lower risk of separation and turbulence of the fluid flow, that is, of the fluid flowing downstream, and thus, in the case of blood, a lower risk of thrombus formation in the fluid pump. At the same time, a more rapid or more extensive increase in the flow cross-section upstream represents a more rapid or more extensive reduction in the flow cross-section in the flow direction, and thus enables a greater acceleration of the fluid flowing through the fluid pump, that is, a greater acceleration of the fluid downstream, and thus more rapid washout and thus more rapid heat removal.

Furthermore, a maximum increase in the flow cross-section, in the direction of the axis of rotation, upstream of the local or regional flow cross-section minimum can be greater than, or equal to, that downstream of the local or regional flow cross-section minimum. If the increase is the same upstream and downstream, the flow cross-section minimum is symmetrical. Such a flow cross-section minimum can be implemented by a symmetrical minimum of the wall diameter and/or by a symmetrical maximum of the bearing diameter. A symmetrical flow cross-section minimum is easy to implement, also across a small region of the profile of the flow cross-section, and is thus in particular advantageous for small fluid pumps. If the increase upstream is greater than downstream, it is not only possible to rapidly accelerate the fluid flow for more rapid washout and cooling, but also to minimize the separation risk of the fluid flow.

The local or regional flow cross-section minimum can be a regional flow cross-section minimum and preferably be located in the region of the contact region as well as downstream of the contact region, in particular in the region of the second bearing element. Such a regional flow cross-section minimum has similar advantages as the above-described flow cross-section minimum having a greater gradient upstream than downstream, namely accelerated washout and cooling, with a low separation risk of the fluid flow.

The local or regional flow cross-section minimum can, in particular, be designed in such a way that wall shear stress has a local maximum or is maximal in the region of the mechanical bearing.

As an alternative or in addition to the formation of a flow cross-section minimum in the region of the mechanical bearing and the above-described exemplary embodiments, an enhancement in the heat removal can also be achieved by optimizing the bearing geometry, in particular the geometry of the individual bearing components. In this case, a surface of the bearing can be increased, in particular in that the bearing diameter is increased, the bearing is designed to be longer in the direction of the axis of rotation and/or a surface of the first and second bearing component has another surface-enlarging geometry. In particular, it is advantageous when the bearing has a length of ≥3 mm, in particular 5 to 8 mm, so as to enable an enhancement in the heat removal.

As an alternative or in addition to the formation of a flow cross-section minimum in the region of the mechanical bearing and the above-described exemplary embodiments, an enhancement in the heat removal or a reduction in the heat development due to friction between the bearing elements can also be achieved by optimizing a material selection for the mechanical bearing. It is particularly advantageous when the first and/or the second bearing elements comprise, or consist of, a material having a low coefficient of friction and/or having a high coefficient of thermal conductivity, in particular a ceramic material, sintered metal and/or diamond. Furthermore, the first and/or second bearing elements can be coated with a material having a low coefficient of friction and/or a high coefficient of thermal conductivity, in particular with a ceramic material, sintered metal and/or diamond.

As an alternative or in addition to the formation of a flow cross-section minimum in the region of the mechanical bearing and/or the above-described exemplary embodiments, another option for optimizing the washout of the bearing region of the mechanical bearing is to arrange an inducer upstream of the mechanical bearing, for generating appropriately oriented vortices in the fluid flow, which enhance the washout of the mechanical bearing.

Furthermore, it is conceivable, in addition or as an alternative to the above-described approaches, to equip the first or second bearing element with rotating elements or blades at the rotor, which protrude beyond the mechanical bearing upstream. These rotating elements can in particular be designed to generate vortices and turbulence in the bearing region, so that washout and cooling of the bearing region of the mechanical bearing are enhanced.

Furthermore, it is conceivable, in addition or as an alternative to the above-described approaches, to provide appropriately designed struts, which are connected to the housing of the fluid pump, upstream of the mechanical bearing as flow elements, which increase the fluid flow and/or the wall shear stress in the bearing region, and thereby enhance washout of the bearing region of the mechanical bearing and heat removal.

Furthermore, it is conceivable, in addition or as an alternative to the above-described approaches, to equip the rotor with an unbalance, which is configured in such a way that the washout is enhanced in the region of the mechanical bearing.

Furthermore, it is conceivable, in addition or as an alternative to the above-described approaches, to provide a surface of the first and/or second bearing elements with a structure or texturing, in particular a plurality of depressions for generating a golf ball effect on the surface of the first and/or second bearing elements. In this way, the fluid flow is manipulated in such a way that bearing washout and cooling of the mechanical bearing are enhanced.

Furthermore, it is conceivable, in addition or as an alternative to the above-described approaches, to arrange a geometry, upstream of the mechanical bearing, which is designed to induce Taylor vortices for enhancing the bearing washout and cooling, and for increasing the wall shear stress in the region of the mechanical bearing.

The mechanical bearing can be arranged at an end of the rotor which faces towards the fluid inlet, that is, can be an inlet-side bearing. The local or regional flow cross-section minimum is then also referred to as an inlet-side flow cross-section minimum.

An inlet-side flow cross-section minimum can minimize the risk of thrombus formation and/or coagulation particularly well, and enhance the heat removal, since the flow in this region, in many designs, does not have a rotatory component that contributes to flushing of the bearing, but is a purely rectilinear flow. Furthermore, the rotor, during operation, experiences a force in the direction of the fluid inlet, which can result in increased heating and/or thrombus formation.

The mechanical bearing can be arranged at an end of the rotor which faces towards the fluid outlet, that is, can be an outlet-side bearing. The local or regional flow cross-section minimum is then also referred to as an outlet-side flow cross-section minimum.

The profile of the flow cross-section can have a second local or regional flow cross-section minimum between the rotor and the housing in the direction of the axis of rotation. The second local or regional flow cross-section minimum can be designed as an inlet-side or outlet-side flow cross-section minimum. In particular, the profile of the flow cross-section can thus have an inlet-side flow cross-section minimum and an outlet-side flow cross-section minimum. As a result of the combination of an inlet-side flow cross-section minimum with an outlet-side flow cross-section minimum, particularly good heat removal can be achieved, and the risk of thrombus formation can be minimized particularly well.

It may be provided that the mechanical bearing is arranged at an end of the rotor which faces towards the fluid inlet, that is, is an inlet-side bearing, wherein the mechanical bearing comprises a first bearing component, connected to the housing, and a second bearing component, connected to the rotor, wherein the local or regional flow cross-section minimum is located at the same axial height as the first bearing component, and the flow cross-section in the local or regional flow cross-section minimum is reduced by ≥10% and/or ≤50%, in particular ≥20% and/or ≤40%, preferably 30%, compared to a flow cross-section in an adjoining region upstream of the bearing region. In that the inlet-side flow cross-section minimum is arranged in the region of the first bearing component, that is, the bearing component located upstream, and an at least ten-percent reduction in the flow cross-section is provided, it can be achieved that a sufficient flow velocity exists when the contact region is passed, and thus thorough washout of the bearing can be achieved.

It can be provided that the flow cross-section minimum is a regional flow cross-section minimum, wherein the mechanical bearing is arranged at an end of the rotor which faces towards the fluid inlet, that is, is an inlet-side bearing, wherein the housing comprises an inner wall that delimits a fluid region and is closed in a circumferential direction around the axis of rotation, wherein the regional flow cross-section minimum is located at the same axial height as the first bearing component. It is also possible to achieve in this way that a sufficient flow velocity exists when the contact region is passed, and thus thorough washout of the bearing can be achieved.

It can be provided that the flow cross-section minimum is a local flow cross-section minimum, wherein the mechanical bearing is arranged at an end of the rotor which faces towards the fluid inlet, that is, is an inlet-side bearing, wherein the housing comprises an inner wall that delimits a fluid region and is closed in a circumferential direction around the axis of rotation, wherein the local flow cross-section minimum results from the inner wall, in the region of the mechanical bearing, comprising a radial constriction, and the flow cross-section increasing in the direction of the axis of rotation, downstream of the flow cross-section minimum.

In the following, a fluid pump according to the invention is described in more detail based on figures. Different elements that are essential to the invention, or elements providing advantageous refinements, are described within the framework of a specific example, wherein it is also possible to use individual of these elements per se to refine the invention, also removed from the context of the respective example and further features of the respective example. Moreover, identical or similar reference numerals are used for identical or similar elements in the figures, and the explanation thereof is therefore partially omitted.

FIG. 1 shows a first exemplary embodiment of a fluid pump 1 according to the invention in a longitudinal sectional view. The fluid pump 1 is a rotary fluid pump, which comprises a housing 2, forming a stator of the rotary fluid pump 1. A rotor 4 is arranged within the housing 2 and rotates about an axis of rotation 5 extending in the longitudinal direction of the fluid pump 1. The rotor 4 is mounted axially and radially in the housing 2 by way of a first mechanical bearing 6a and a second mechanical bearing 6b.

The first mechanical bearing 6a comprises a first bearing element 7a and a second bearing element 8a. The first bearing element 7a is rigidly connected to the housing 2 via struts 12, which form part of a cage geometry at the inlet of the fluid pump. The second bearing element 8a is rigidly connected to the rotor 4. In a contact region between the first bearing element 7a and the second bearing element 8a, the first bearing element 7a and the second bearing element 8a make contact with one another, except for a bearing gap 9a. A portion of the fluid conveyed by the fluid pump can be present in the bearing gap 9a and form a fluid film, so that the first and second bearing elements 7a and 8a glide on one another in the contact region. The first mechanical bearing 6a is a ball cup bearing, wherein the first bearing element 7a has a convex, spherical surface, and the second bearing element 8a has a concave, spherical surface, in the contact region. It is likewise conceivable that the first bearing element 7a has a concave, spherical surface, and the second bearing element 8a has a convex, spherical surface. The contact region, thus spherically formed, of the first mechanical bearing allows the rotor 4 to be mounted both in the axial and in the radial direction.

The second mechanical bearing 6b likewise comprises a first bearing element 7b and a second bearing element 8b, wherein the first bearing element 7b is rigidly anchored in the housing 2, and the second bearing element 8b is rigidly connected to the rotor 4. Between the first bearing element 7b and the second bearing element 8b, the first bearing element 7b and the second bearing element 8b optionally make contact with one another, except for a bearing gap 9b. A portion of the fluid conveyed by the fluid pump can be present in the bearing gap and form a fluid film, so that the first and second bearing elements 7b and 8b glide on one another over the fluid film. Similarly to the first mechanical bearing 6a, the second mechanical bearing 6b is designed as a ball cup bearing including a spherical contact region, wherein a surface of the first bearing element 7b is designed to be spherically concave, and a surface of the second bearing element 8b is designed to be spherically convex, in the contact region. The contact region of the second mechanical bearing likewise allows the rotor 4 to be mounted both in the axial and in the radial direction.

The fluid pump 1 comprises a fluid region 11 between the rotor 4 and an inner wall 10 of the housing 2 facing the rotor 4, through which the fluid conveyed by the fluid pump flows. The fluid to be conveyed reaches the fluid region 11 via a fluid inlet 3 of the fluid pump which is arranged in the region of the struts 12, and is transported away from the fluid inlet 3 as a result of the rotational movement of the rotor 4 in the direction of the axis of rotation 5. The fluid region 11 is widened in the region of the second mechanical bearing 6b to form a volute 13. In the volute 13, the substantially axial movement of the fluid transitions into a substantially radial movement, wherein the fluid is subsequently expelled radially to the axis of rotation 5 from a fluid outlet (not shown here) arranged in the volute 13.

The first mechanical bearing 6a is arranged at an end of the rotor 4 which faces towards the fluid inlet 3, that is, is an inlet-side bearing. The second mechanical bearing 6a is arranged at an end of the rotor 4 which faces towards the fluid outlet, that is, is an outlet-side bearing.

The fluid region 11 has a variable flow cross-section in the direction of the axis of rotation. In the region of the first mechanical bearing 6a, the flow cross-section, at the transition from the first bearing element 7a to the second bearing element 7b, has a decrease in the flow cross-section in the flow direction, wherein the flow cross-section, still in the region of the second bearing element 8a, reaches a flow cross-section minimum 14 which continues in the flow direction, across the remaining length of the second bearing element 8a as well as a majority of the rotor length. In this way, the profile of the flow cross-section has a regional flow cross-section minimum 14 in the region of the second bearing element 8a. The decrease in the flow cross-section in the region of the second bearing element 8a is achieved by a gradual increase in the circumference of the second bearing element 8a in the flow direction, wherein a wall diameter of the inner wall in the region of the first mechanical bearing 6a along the axis of rotation 5 is constant. The maximum circumference of the second bearing element 8a is greater than the maximum circumference of the first bearing element 7a. The decrease in the flow cross-section in the region of the second bearing element 8a allows an acceleration of the fluid over the first mechanical bearing 6a, whereby this is washed out better, and frictional heat developing in the bearing 6a is eliminated more quickly.

Figure 2:
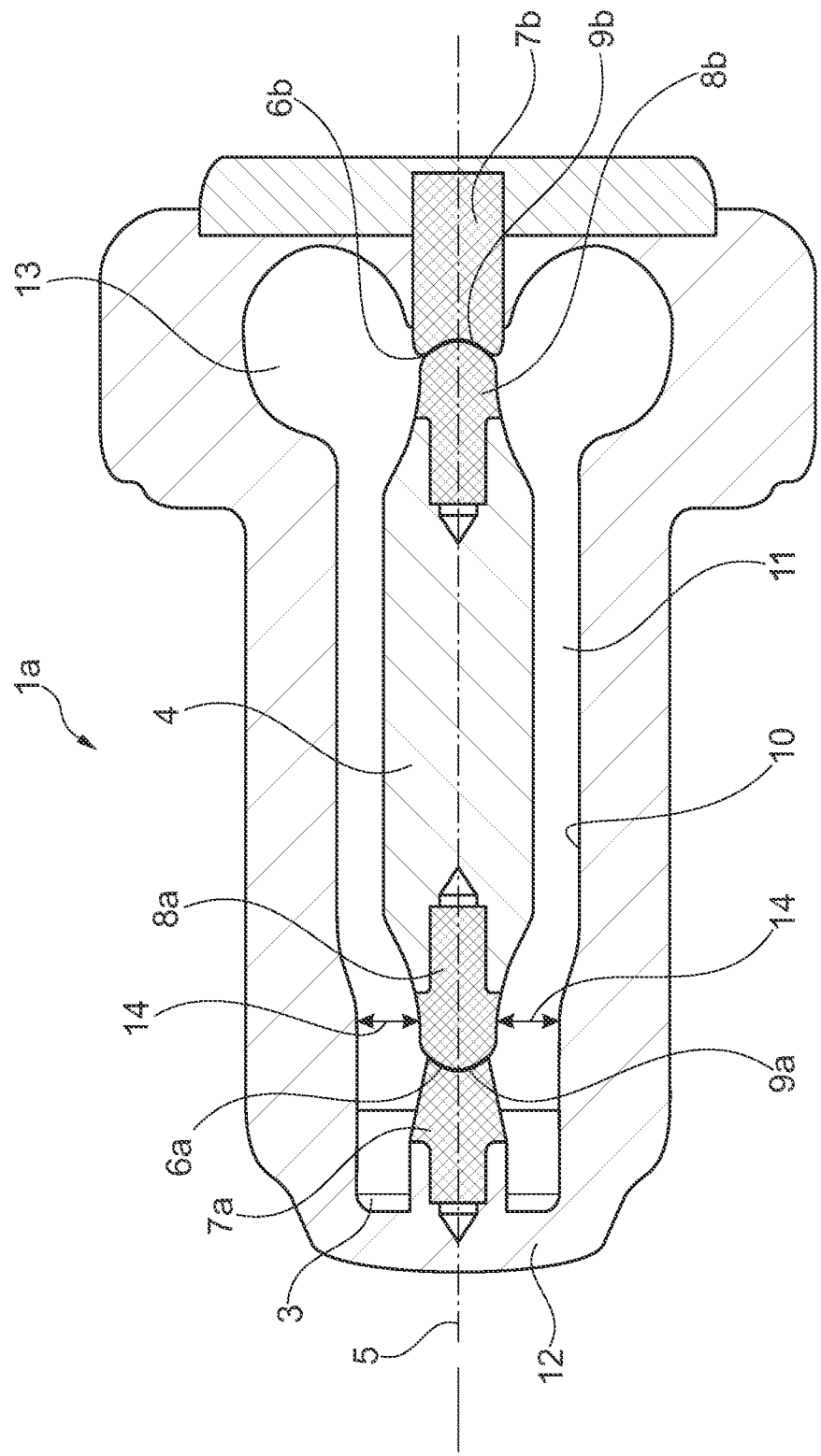
FIG. 2 shows a schematic longitudinal sectional view of a fluid pump according to the invention in accordance with a second exemplary embodiment.

FIG. 2 shows a second exemplary embodiment of a fluid pump 1a according to the invention in a longitudinal sectional view. The fluid pump 1a is designed similarly to the fluid pump 1 of the first exemplary embodiment. The fluid pump 1a essentially only differs from the fluid pump 1 of the first exemplary embodiment in the design of the first mechanical bearing 6a. The first mechanical bearing 6a of the fluid pump 1a is likewise designed as a ball cup bearing, wherein, however, the first bearing element 7a has a spherically concave surface in the contact region, and the second bearing element 8a has a spherically convex surface, wherein the first and second bearing elements 7a and 8a can glide on top of one another, along the mutually facing surfaces thereof, over a fluid film that is present in the bearing gap 9a. Similarly to the first exemplary embodiment, the second bearing element 8a, in the flow direction, has a gradual increase in circumference beyond a maximum circumference of the first bearing element 7a, which results in a flow cross-section decrease in the case of a wall diameter of the inner wall 10 which remains the same in the region of the first mechanical bearing 6a. After the maximum circumference has been reached, the circumference of the second bearing element 8a or of the directly adjoining rotor body of the rotor 4 decreases. The flow cross-section for the fluid to be conveyed by the fluid pump 1a thus has a local flow cross-section minimum 14 in the region of the second bearing element 8a of the first mechanical bearing 6a, which is achieved by a local circumference maximum of the second bearing element 8a. The local flow cross-section minimum 14 allows an acceleration of the fluid over the first mechanical bearing 6a, whereby this can be washed out better, and frictional heat developing in the bearing 6a can be eliminated more quickly.

Figure 3:
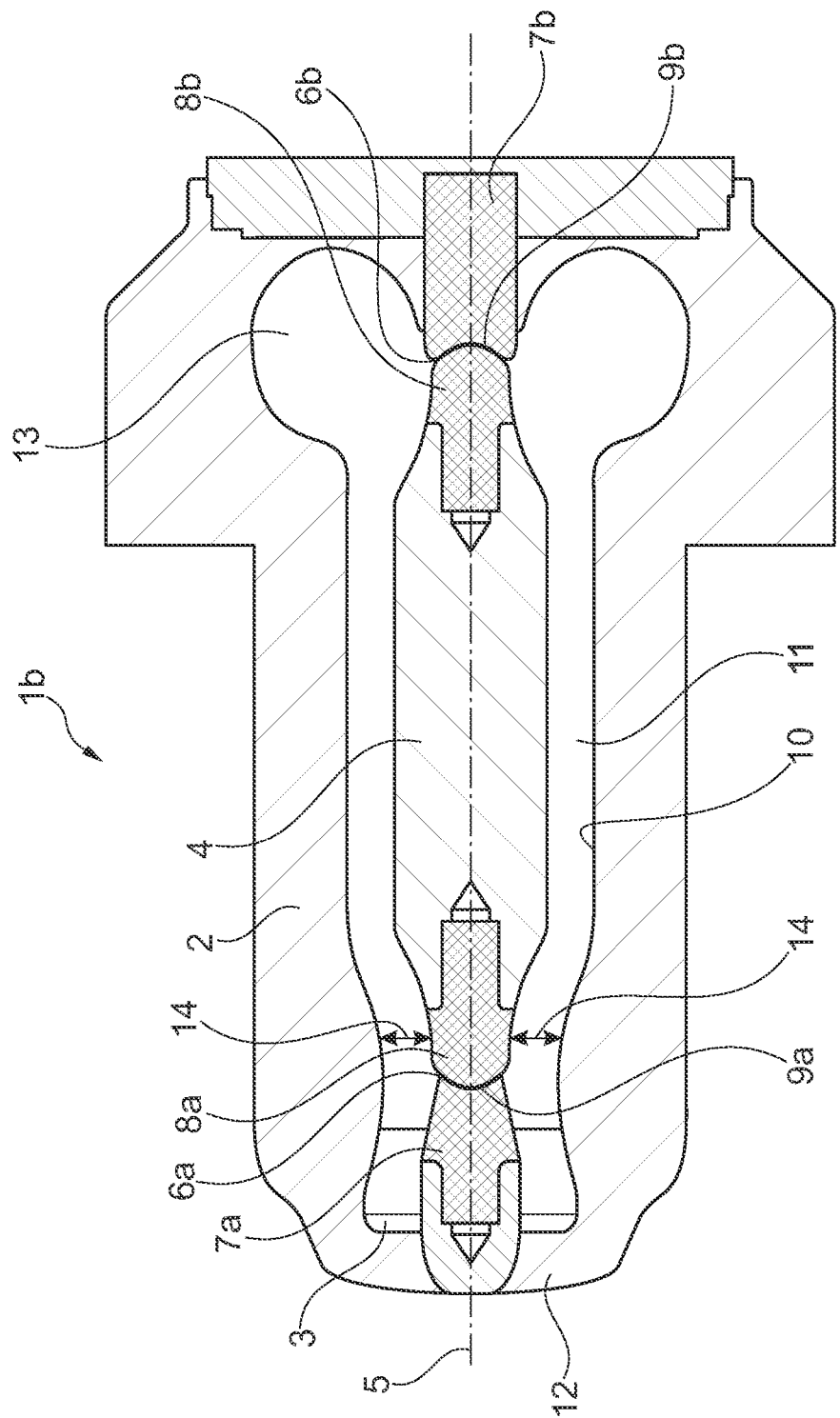
FIG. 3 shows a schematic longitudinal sectional view of a fluid pump according to the invention in accordance with a third exemplary embodiment.

FIG. 3 shows a third exemplary embodiment of a fluid pump 1b according to the invention in a longitudinal sectional view. The fluid pump 1b is essentially designed like the fluid pump 1a of the second exemplary embodiment. The fluid pump 1b differs from the fluid pump 1a in that the inner wall 10 includes a radial constriction in the region of the first mechanical bearing 6a. In this way, the wall diameter of the inner wall 10 is not constant along the axis of rotation 5, but has a minimum in the region of the second bearing element 8a of the first mechanical bearing 6a. This minimum of the wall diameter is situated at the location along the axis of rotation 5 at which the circumference of the second bearing element 8a has a local maximum. At this location, the flow cross-section profile along the axis of rotation has a local flow cross-section minimum 14. As a result of the combined reduction in the wall diameter and increase in the circumference of the second bearing element 8a in the region of the first mechanical bearing 6a, a more extensive decrease in the flow cross-section, and thus a greater acceleration of the fluid, can be achieved in the region of the first mechanical bearing 6a. In this way the washout and cooling of the first mechanical bearing 6a can be enhanced.

Figure 4:
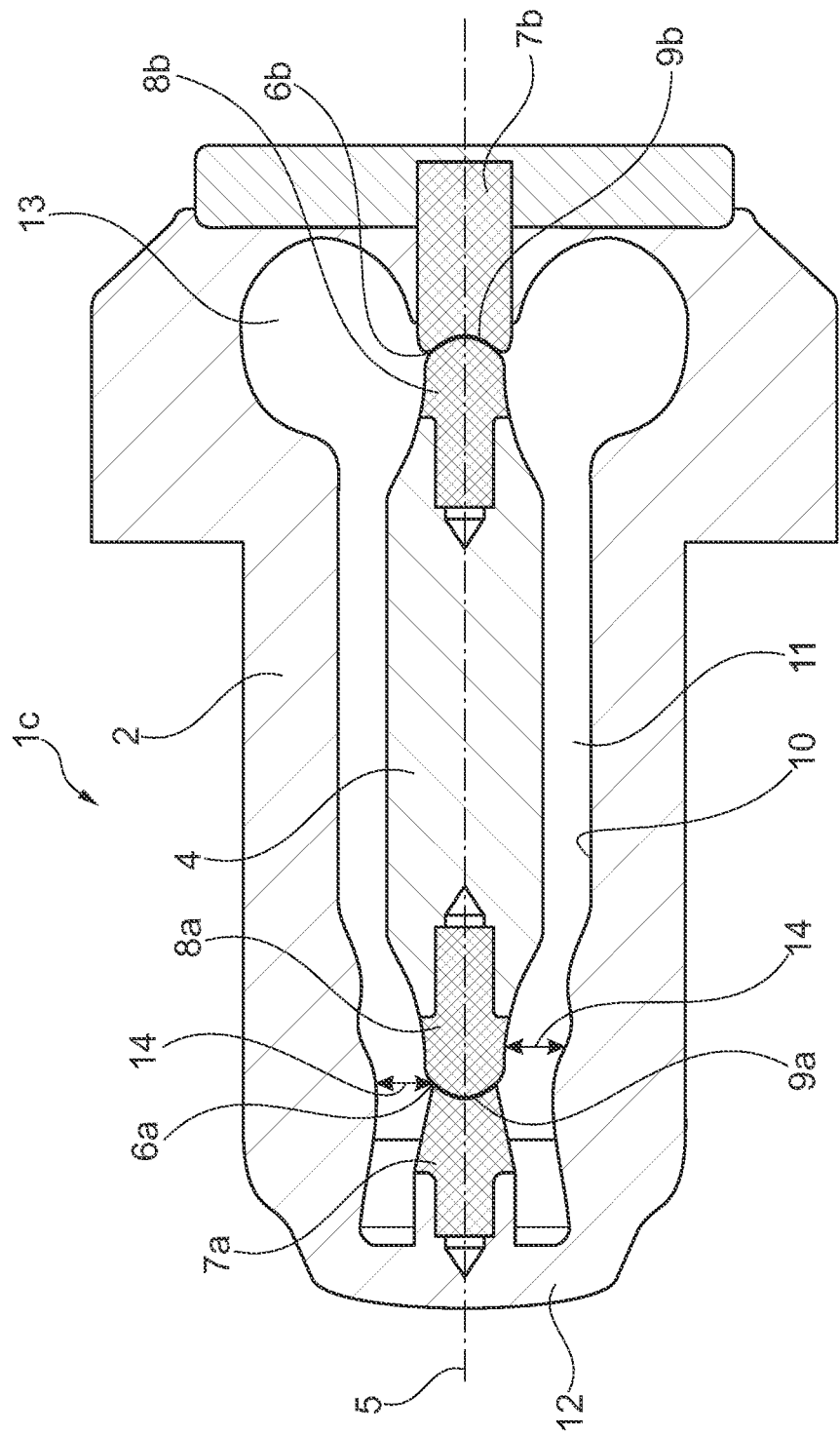
FIG. 4 shows a schematic longitudinal sectional view of a fluid pump according to the invention in accordance with a fourth exemplary embodiment.

FIG. 4 shows a fourth exemplary embodiment of a fluid pump 1c according to the invention in a longitudinal sectional view. The fluid pump 1c of FIG. 4 is essentially designed like the fluid pump 1b of FIG. 3. The fluid pump 1c of FIG. 4 differs from the fluid pump 1b of FIG. 3 in the position and extent of the radial constriction of the inner wall 10 along the axis of rotation 5. In contrast to the inner wall 10 of the fluid pump 1b, the wall diameter is not locally decreased in the region of the second bearing element 8a, but in the region of the bearing gap 9a. Furthermore, the reduction is more extensive than in the case of the inner wall 10 of the fluid pump 1b. The fluid pump 1c thus has a local flow cross-section minimum 14 in the region of the bearing gap 9a of the first mechanical bearing 6a.

FIGS. 5 to 12 show different variants of a flow cross-section profile according to the invention along the axis of rotation 5 in the region of the first mechanical bearing 6a in a schematic view.

In FIG. 5a, the inner wall 10 has a radial constriction at the axial height of the bearing gap 9a. The radial constriction is symmetrical with respect to the bearing gap 9a. The bearing 6a itself, in contrast, does not include a widening. The circumferences of the first and second bearing elements 7a and 8a are substantially identical. This results in a local flow cross-section minimum 14 at the height of the bearing 6a (L), and in particular of the bearing gap 9a, as is shown in FIG. 5b. FIG. 5b shows the profile of the actual flow cross-section A along the axis of rotation (z). The local flow cross-section minimum 14 allows an acceleration of the fluid 15 in the region of the bearing 6a, thus enhancing washout and cooling of the bearing. The particular advantage of this flow geometry is that this is easy to implement, independent of the direction, and suitable for a short design, such as for example for small fluid pumps.

Figure 6:
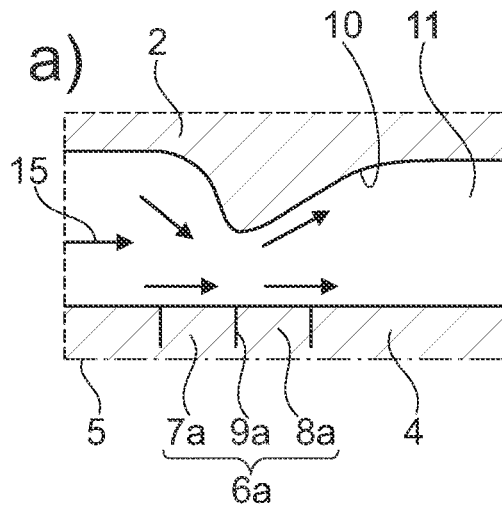

FIG. 6a shows a radial constriction of the inner wall 10 which is asymmetrical with respect to the bearing gap 9a and in which the flow cross-section decreases rapidly in the flow direction up to the bearing gap 9a and, after the flow cross-section minimum 14 has been passed, slowly increases again. In FIG. 6, the flow cross-section minimum is also only implemented by a radial constriction of the inner wall 10, without the first mechanical bearing 6a widening. The advantage of this flow geometry is that the fluid flow is directed strongly inward, and is strongly accelerated over the bearing 6a. As a result of the slow increase in the flow cross-section after passing through the minimum, the separation risk of the fluid flow is decreased.

Figure 5:
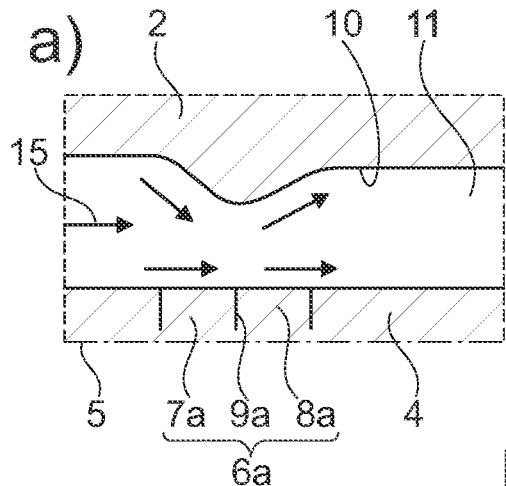
FIGS. 5 to 12 show different variants of possible flow cross-section profiles in schematic views.
Figure 7:
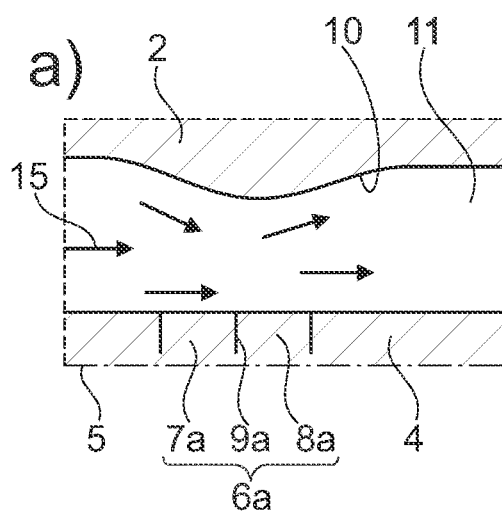

Similarly to FIG. 5, FIG. 7 shows a symmetrical flow cross-section minimum 14, which is again only implemented by a radial constriction of the inner wall. The gradients upstream and downstream of the flow cross-section minimum 14, however, are smaller in FIG. 7 than in FIG. 5, resulting in a lower separation risk for the fluid flow. This flow geometry is suitable in particular for larger fluid pumps.

Figure 8:
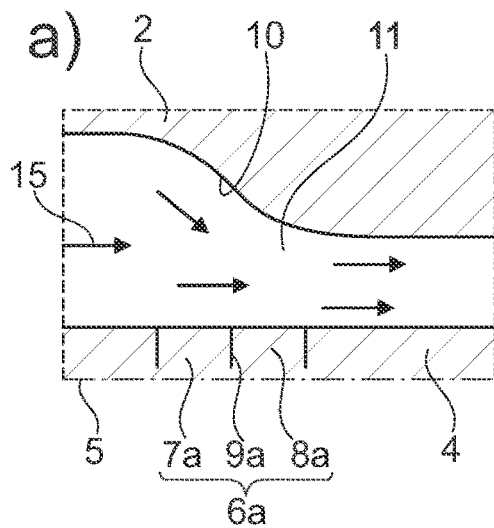

FIG. 8 shows a regional flow cross-section minimum, which is implemented by a regional radial constriction of the inner wall 10 at the height of the bearing 6a. At the height of the bearing gap 9a, the constriction reaches a maximum, so that the wall diameter remains constantly reduced, starting from the bearing gap 9a to the rotor 4. The regional flow cross-section minimum 14 likewise extends approximately from the bearing gap 9a into the region of the rotor 4. The advantage of this flow geometry is the acceleration of the fluid flow over the bearing 6a, and thus enhanced washout and cooling of the bearing 6a, as well as a low separation risk for the fluid flow when the flow cross-section minimum 14 is reached.

Figure 9:
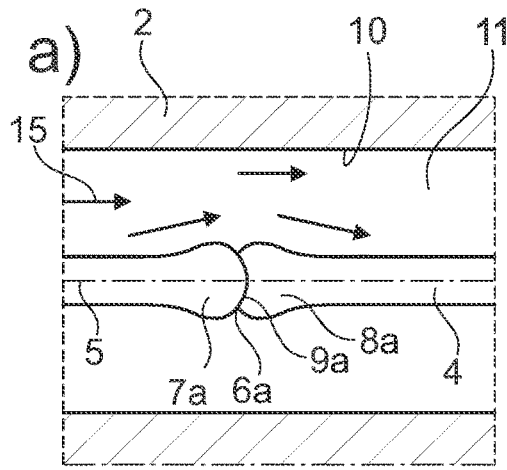

FIG. 9 shows a symmetrical flow cross-section minimum 14 in the region of the bearing gap 9a, which is only implemented by a symmetrical widening of the first and second bearing components 7a and 8a close to the contact region or the bearing gap 9a. The inner wall 10 does not include a radial constriction and can have a constant wall diameter along the axis of rotation 5. The advantage of this flow geometry is, in particular, that the housing 2 (pump tube) is easy to produce. As a result of selecting different gradients for the widening of the bearing components, the fluid flow at the height of the bearing 6a, and thus washout and cooling of the bearing region, can be further optimized.

Figure 10:
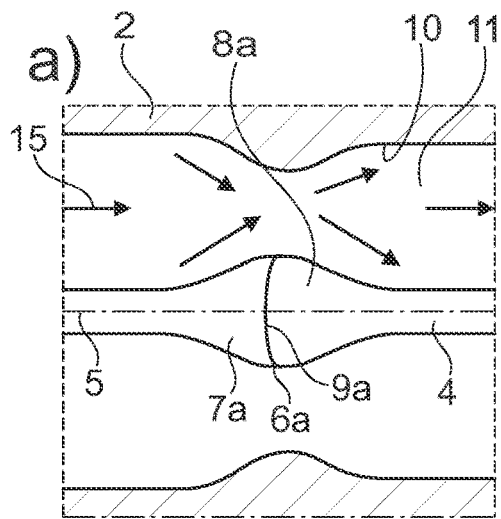

FIG. 10 shows a combination of the variants from FIG. 5 and FIG. 9. The symmetrical flow cross-section minimum 14 is implemented both by a symmetrical widening of the bearing components 7a and 8a, and by a radial constriction of the inner wall 10 that is symmetrical around the bearing gap 9a. This combination enables a maximum decrease in the flow cross-section in the region of the bearing 6a, and thus a maximum acceleration of the fluid flow as well as enhanced washout and cooling of the bearing region.

Figure 11:
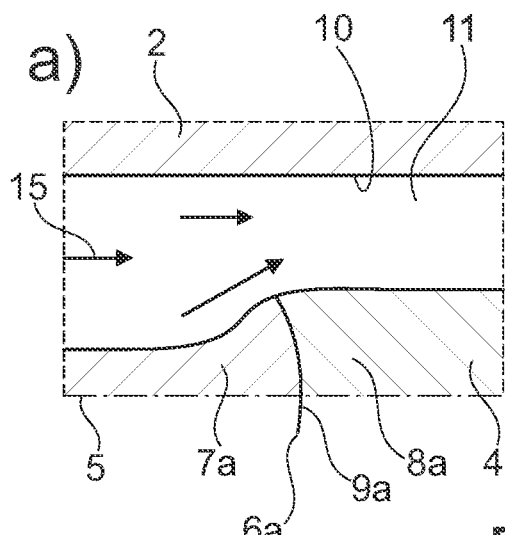
Figure 11:
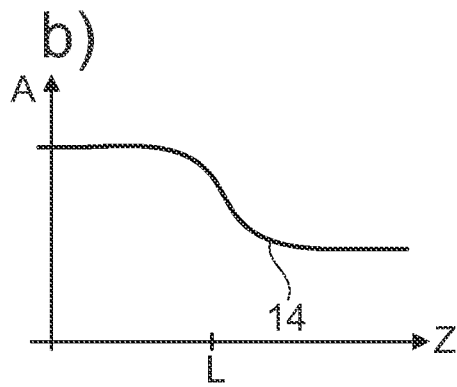

FIG. 11 shows a regional flow cross-section minimum 14, which is only implemented by a widening of the bearing 6a. In the process, the first bearing element 7a is gradually widened to the bearing gap 9a. Downstream of the bearing gap 9a, the widening, in the region of the second bearing element 8a, reaches a maximum and remains at the maximum up to the region of the rotor 4. The wall diameter of the inner wall 10 remains constant in the region of the bearing 6a. Accordingly, the regional flow cross-section minimum 14 begins downstream of the bearing gap 9a, and extends along the axis of rotation 5 into the region of the rotor 4. This flow geometry also enables an acceleration of the fluid in the bearing region, and thus enhanced washout and cooling of the bearing 6a.

Figure 12:
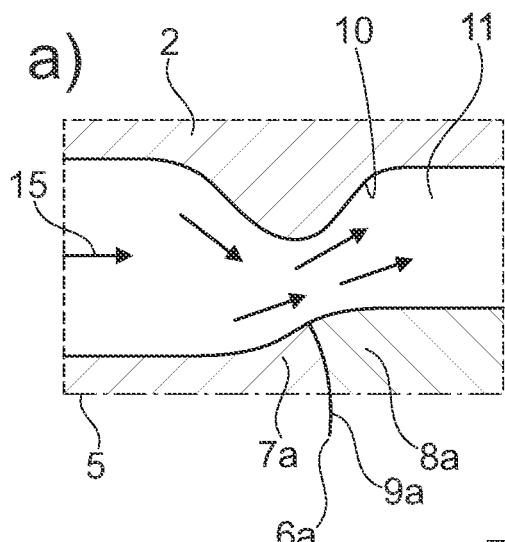
Figure 12:
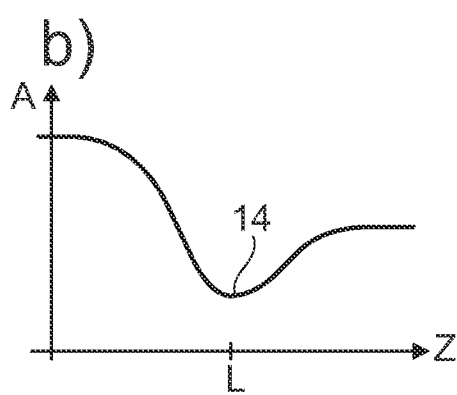

FIG. 12 shows a combination of the variants from FIG. 5 and FIG. 11. FIG. 12 shows an asymmetrical flow cross-section minimum 14 around the bearing gap 9a, which is implemented by a regional widening of the bearing 6a corresponding to FIG. 11, and by a symmetrical radial constriction of the inner wall at the bearing gap 9a.

Upstream of the flow cross-section minimum 14, the flow cross-section decreases drastically in the flow direction, while the flow cross-section downstream of the flow cross-section minimum increases more slowly again to a lower flow cross-section than before the reduction. This has the advantage that, on the one hand, a high acceleration of the fluid, and thus favorable washout and cooling of the bearing 6a, are achieved, and, on the other hand, that the separation risk of the fluid flow at the inner wall 10, after passing through the flow cross-section minimum 14, is low.

To clarify the use of and to hereby provide notice to the public, the phrases "at least one of <A>, <B>, . . . and <N>" or "at least one of <A>, <B>, . . . or <N>" or "at least one of <A>, <B>, . . . <N>, or combinations thereof" or "<A>, <B>, . . . and/or <N>" are defined by the Applicant in the broadest sense, superseding any other implied definitions hereinbefore or hereinafter unless expressly asserted by the Applicant to the contrary, to mean one or more elements selected from the group comprising A, B, . . . and N. In other words, the phrases mean any combination of one or more of the elements A, B, . . . or N including any one element alone or the one element in combination with one or more of the other elements which may also include, in combination, additional elements not listed. Unless otherwise indicated or the context suggests otherwise, as used herein, "a" or "an" means "at least one" or "one or more."

The invention claimed is:

1. A fluid pump for conveying a fluid comprising:
a housing including a fluid inlet and a fluid outlet
and a rotor, which is arranged rotatably about an axis of rotation within the housing for conveying fluid between the fluid inlet and the fluid outlet, the rotor having an inlet-side end extending towards the fluid inlet, an outlet-side end extending towards the fluid outlet, and an outer surface radial to the axis of rotation and cooperating with an inner surface of the housing to define a flow channel for conveying fluid between the rotor and the housing,
the rotor being mounted in the housing by way of a mechanical bearing, wherein the mechanical bearing is arranged at the inlet-side end of the rotor, and where the mechanical bearing comprises at least a first bearing component associated with the housing in contact with at least a second bearing component associated with the rotor, and
wherein within the flow channel a profile of a flow cross-section between the outer surface of the rotor and the inner surface of the housing, in the direction of the axis of rotation, has a local or regional flow cross-section minimum in the region of the mechanical bearing;
wherein a maximum increase in the flow cross-section, in the direction of the axis of rotation, upstream of the local or regional flow cross-section minimum is greater than, or equal to, that downstream of the local or regional flow cross-section minimum.

2. A fluid pump for conveying a fluid comprising:
a housing including a fluid inlet and a fluid outlet
and a rotor, which is arranged rotatably about an axis of rotation within the housing for conveying fluid from the fluid inlet to the fluid outlet, the rotor having an inlet-side end extending towards the fluid inlet and an outlet-side end extending towards the fluid outlet,
the rotor being mounted in the housing by way of a mechanical bearing, wherein the mechanical bearing is arranged at the inlet-side end of the rotor, and where the mechanical bearing comprises at least a first bearing component associated with the housing in contact with at least a second bearing component associated with the rotor,
wherein a profile of a flow cross-section between the rotor and the housing, in the direction of the axis of rotation, has a local or regional flow cross-section minimum in the region of the mechanical bearing, and
wherein a maximum increase in the flow cross-section, in the direction of the axis of rotation, upstream of the local or regional flow cross-section minimum is greater than, or equal to, that downstream of the local or regional flow cross-section minimum.

3. The fluid pump of claim 2, wherein the local or regional flow cross-section minimum is located in the region of the first bearing component, in the region of the second bearing component, and/or in the region of the contact region.

4. The fluid pump of claim 2, wherein the housing comprises an inner wall that delimits a fluid region and is closed in a circumferential direction around the axis of rotation, and the local or regional flow cross-section minimum results from a profile of a wall diameter of the inner wall, in the direction of the axis of rotation, having a local or regional minimum in the region of the mechanical bearing.

5. The fluid pump of claim 3, wherein the profile of the wall diameter has a local or regional minimum in the region of the first bearing component, in the region of the second bearing component and/or in the region of the contact region.

6. The fluid pump of claim 3, wherein the local flow cross-section minimum results from a profile of a bearing diameter of the mechanical bearing having a local or regional maximum in the direction of the axis of rotation.

7. The fluid pump of claim 6, wherein the profile of the bearing diameter has a local or regional maximum in the region of the first bearing component, in the region of the second bearing component and/or in the region of the contact region.

8. The fluid pump of claim 2, wherein the flow cross-section is reduced in the local or regional flow cross-section minimum by ≥10% and/or ≤50% compared to a flow cross-section in a region adjoining the bearing region upstream and/or downstream.

9. The fluid pump of claim 2, wherein the flow cross-section, in the direction of the axis of rotation, increases by ≥2% of the flow cross-section minimum per mm and/or ≤30% of the flow cross-section minimum per mm upstream of the flow cross-section minimum, and increases by ≤20% of the flow cross-section minimum per mm downstream of the flow cross-section minimum.

10. The fluid pump of claim 2, wherein the flow cross-section, in the direction of the axis of rotation, increases by ≥2% of the flow cross-section minimum per mm and/or ≤30% of the flow cross-section minimum per mm upstream and/or downstream of the flow cross-section minimum.

11. The fluid pump of claim 3, wherein the local or regional flow cross-section minimum is a regional flow cross-section minimum and is located in the region of the contact region as well as downstream of the contact region.

12. The fluid pump of claim 2, wherein local or regional flow cross-section minimum is designed in such a way that a wall shear stress has a local maximum or is maximal in the region of the mechanical bearing.

13. The fluid pump of claim 3, wherein the first and/or the second bearing components comprise, or consist of, a material having a low coefficient of friction and/or a material having a high coefficient of thermal conductivity selected from a ceramic material, sintered metal and/or diamond.

14. The fluid pump of claim 2,
wherein the local or regional flow cross-section minimum is located at the same axial height as the first bearing component.

15. The fluid pump of claim 14, wherein the flow cross-section is reduced in the local or regional flow cross-section minimum by >10% compared to a flow cross-section in a region adjoining the bearing region upstream.

16. The fluid pump of claim 2,
wherein the housing comprises an inner wall that delimits a fluid region and is closed in a circumferential direction around the axis of rotation, and
the local or regional flow cross-section minimum results from the inner wall, in the region of the mechanical bearing, comprising a radial constriction.

17. The fluid pump of claim 16, wherein the flow cross-section minimum is a local flow cross-section minimum, and the flow cross-section increases in the direction of the axis of rotation, downstream of the flow cross-section minimum.

18. The fluid pump of claim 14, wherein the flow cross-section minimum has a regional flow cross-section minimum.

\* \* \* \* \*